(12) United States Patent
Drohan

(10) Patent No.: US 9,149,776 B2
(45) Date of Patent: Oct. 6, 2015

(54) SYSTEMS AND METHODS FOR LIQUID FUEL MODELING

(75) Inventor: John Benjamin Drohan, Greer, SC (US)

(73) Assignee: General Electric Company, Schenectady, NY (US)

( * ) Notice: Subject to any disclaimer, the term of this patent is extended or adjusted under 35 U.S.C. 154(b) by 663 days.

(21) Appl. No.: 13/549,186

(22) Filed: Jul. 13, 2012

(65) Prior Publication Data
US 2014/0018973 A1    Jan. 16, 2014

(51) Int. Cl.
B01F 15/00 (2006.01)
G05D 21/02 (2006.01)
F02C 9/00 (2006.01)

(52) U.S. Cl.
CPC ............ B01F 15/00123 (2013.01); F02C 9/00 (2013.01); G05D 21/02 (2013.01); F05D 2270/71 (2013.01)

(58) Field of Classification Search
CPC .................................. G05D 23/00; F02C 9/00
USPC ................. 700/275, 286, 287, 290, 300, 265; 701/100, 101, 104, 59, 99; 60/39.01, 60/272, 625, 602
See application file for complete search history.

(56) References Cited

U.S. PATENT DOCUMENTS

| 6,283,087 B1* | 9/2001 | Isaksen .................... 123/243 |
| 7,742,904 B2 | 6/2010 | Healy et al. |
| 2004/0261414 A1* | 12/2004 | Araki ............................. 60/602 |
| 2009/0308608 A1* | 12/2009 | Kaminsky et al. .......... 166/272.1 |

OTHER PUBLICATIONS

Avallone, Eugene A., Marks' Standard Handbook for Mechanical Engineers, pp. 7-10 through 7-16, 1996.

* cited by examiner

Primary Examiner — Mohammad Ali
Assistant Examiner — Ziaul Karim
(74) Attorney, Agent, or Firm — Fletcher Yoder, P.C.

(57) ABSTRACT

A system includes a model-based control unit configured to receive a lower heating value for a liquid fuel having a composition. The processor is configured to determine a specific gravity, a hydrocarbon ratio, or both, for the liquid fuel based, at least in part, on the lower heating value of the liquid fuel. The processor is configured to compare the hydrocarbon ratio, the specific gravity, and/or the lower heating value of the liquid fuel to a collection of hydrocarbon ratios, specific gravities, and/or lower heating values for a plurality of mixtures of methane and ethylene. The processor is configured to identify a mixture of methane and ethylene from the collection that best matches the hydrocarbon ratio, the specific gravity, and/or the lower heating value of the liquid fuel and configured to use the identified mixture of methane and ethylene as a model for the composition of the liquid fuel.

9 Claims, 3 Drawing Sheets

SYSTEMS AND METHODS FOR LIQUID FUEL MODELING

BACKGROUND OF THE INVENTION

The subject matter disclosed herein relates to gas turbine systems and, more specifically, to gas turbines that use liquid fuel.

In general, gas turbine systems may consume a fuel to produce rotational energy to power a load. Certain gas turbine systems are capable of combusting a liquid fuel (e.g., an oil or slurry) in one or more combustors in order to drive a turbine. In such systems, there may be significant variation in the chemical composition of the liquid fuel over time. As the fuel composition fluctuates, this may cause undesirable inconsistency in the operation of the gas turbine system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes a model-based control unit configured to receive a lower heating value for a liquid fuel having a composition. The processor is configured to determine a specific gravity, a hydrocarbon ratio, or both, for the liquid fuel based, at least in part, on the lower heating value of the liquid fuel. The processor is configured to compare the hydrocarbon ratio, the specific gravity, and/or the lower heating value of the liquid fuel to a collection of hydrocarbon ratios, specific gravities, and/or lower heating values for a plurality of mixtures of methane and ethylene. The processor is configured to identify a mixture of methane and ethylene from the collection that best matches the hydrocarbon ratio, the specific gravity, and/or the lower heating value of the liquid fuel and configured to use the identified mixture of methane and ethylene as a model for the composition of the liquid fuel.

In another embodiment, a method includes determining an estimated specific gravity of a liquid fuel based, at least in part, on a measured lower heating value of a liquid fuel having a composition. The method includes determining an estimated hydrocarbon ratio of the liquid fuel based, at least in part, on the estimated specific gravity of the liquid fuel. The method includes selecting a hydrocarbon mixture from a plurality of hydrocarbon mixtures to serve as a model for the composition of the liquid fuel. Further, the selected hydrocarbon mixture has a hydrocarbon ratio, a specific gravity, and/or a lower heating value similar to the estimated hydrocarbon ratio, the estimated specific gravity, and/or the measured lower heating value of the liquid fuel.

In another embodiment, a non-transitory, computer-readable medium stores instructions executable by a processor of an electronic device, the instructions comprising instructions to determine a first lower heating value of a liquid fuel, wherein the liquid fuel comprises a composition, a first hydrocarbon ratio, and a first specific gravity. The instruction include instructions to identify a mixture of methane and ethylene having a second hydrocarbon ratio, second specific gravity, and/or second lower heating value that is similar to the hydrocarbon ratio, the first specific gravity, and/or the first lower heating value to serve as a model of the composition of the liquid fuel when simulating a combustion system consuming the liquid fuel during operation. The instructions include instructions to modify a parameter of the combustion system based, at least in part, on the simulation of the combustion system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
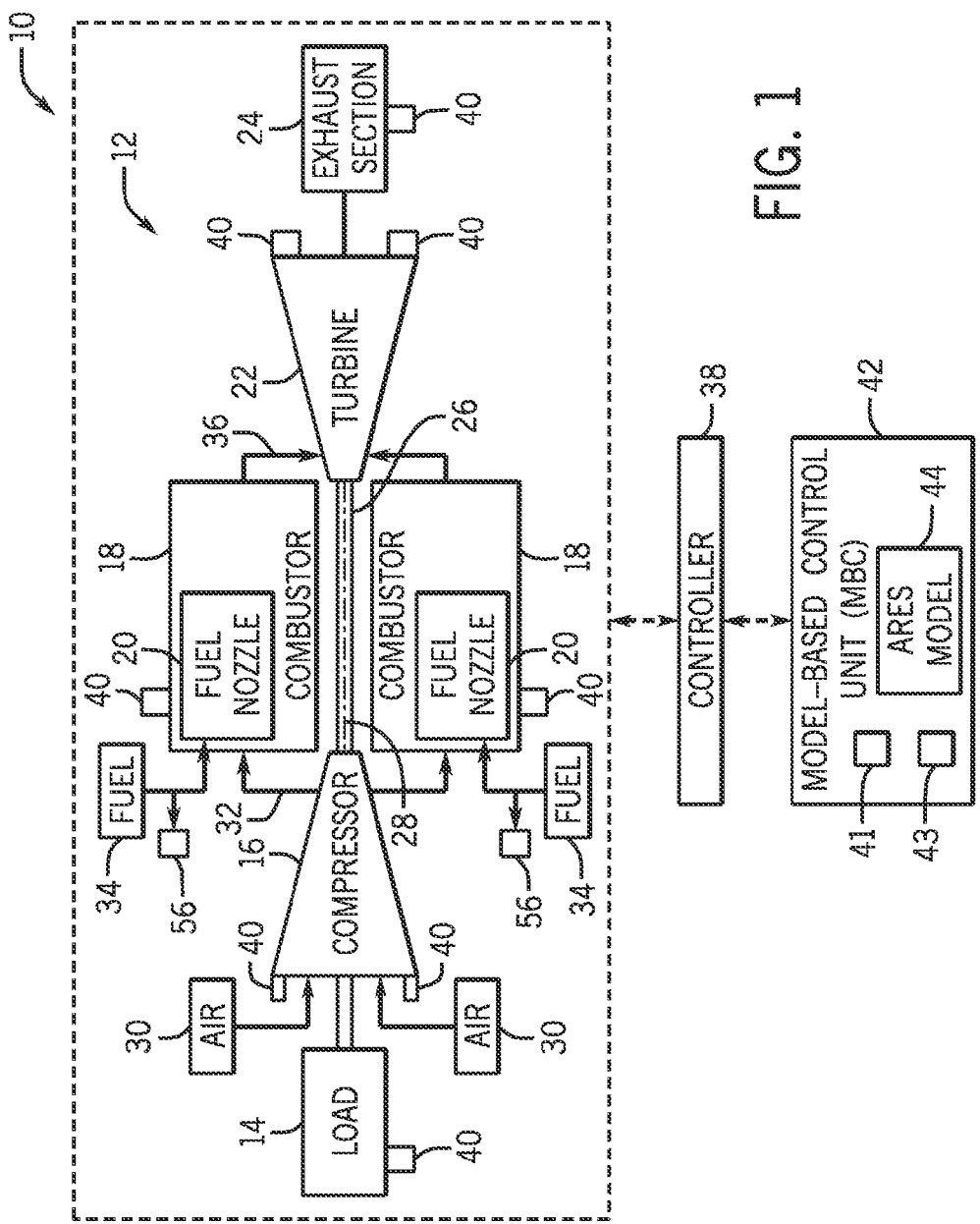
FIG. 1 is a block diagram of a turbine system having a model-based control (MBC) unit utilizing an Adaptive Real-time Engine Simulator (ARES) model, in accordance aspects of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As mentioned, certain gas turbine systems are capable of consuming a liquid fuel (e.g., an oil or slurry) during operation. However, since there may be significant variation in the chemical composition of the liquid fuel over time, the parameters of the gas turbine system (e.g., the rotational speed of the turbine, flame temperature, combustion dynamics, energy output, exhaust temperature, exhaust composition, exhaust volume, and the like) may also vary. This may produce undesirable inconsistency in the operation of the gas turbine system. Furthermore, in certain situations, the exact composition of a liquid fuel may not be known. As such, it may be desirable for a gas turbine system to have a system for modeling the chemical composition of the liquid fuel.

Accordingly, the presently disclosed system enables the creation of a model for the chemical composition of a liquid fuel based on a simulated mixture of two or more simple hydrocarbons (e.g., methane and ethylene). In contrast to other methods of fuel modeling, the presently disclosed model enables an estimate of the chemical composition of the liquid fuel that is based on a determined lower heating value (LHV), also known as the net calorific value or lower calorific value (e.g., measured via calorimetry). Using this measured LHV, the presently disclosed system may determine or estimate the specific gravity (SG) and the hydrocarbon ratio (H/C) for the liquid fuel, enabling the identification of a certain mixture of simple hydrocarbons (e.g., methane and ethylene) having substantially similar properties (e.g., H/C, SG, and/or LHV) as the liquid fuel. Subsequently, the identified mixture of simple hydrocarbons may further be used by the system as a model for the liquid fuel as the system simulates a gas turbine combusting mixture during operation. Furthermore, based on the operation of the simulated gas turbine, the presently disclosed system may determine one or more parameters (e.g., fuel flow rates, air flow rates, etc.) of an actual gas turbine system to alter in order to adjust the operation of the gas turbine system.

With the forgoing in mind, FIG. 1 is a block diagram of an embodiment of a turbine system 10 that may use the presently disclosed fuel modeling techniques. While the advantages of the present fuel modeling techniques may be presented in the context of turbine system 10, it should be appreciated that the present technique may be applicable to modeling any system that consumes or combusts a liquid fuel (e.g., a combustion system, a reactor, a furnace, or other suitable system). The illustrated turbine system 10 includes a gas turbine engine 12 coupled to a load 14, such as an electrical generator. The gas turbine engine 12 includes a compressor 16, a plurality of combustors 18 each having at least one fuel nozzle 20, a turbine 22, and an exhaust section 24. As illustrated, one or more shafts 26 connect the load 14, compressor 16, and turbine 22. The compressor 16 and the turbine 22 each include a rotor with blades, which rotate within a stator or shroud. In operation, the compressor 16 receives air 30 and delivers compressed air 32 to the combustors 18 and/or fuel nozzles 20, which then inject fuel 34 (or an air-fuel mixture) into a combustion region in the combustors 18. In turn, the air-fuel mixture combusts in the combustors 18 to produce hot combustion gases 36, which drive blades within the turbine 18. As the turbine is driven to rotate the shaft 26, the compressor 16 is driven to compress the air 16 into the combustors 18 and/or fuel nozzles 20.

Additionally, the illustrated turbine system 10 includes a controller 38 that may generally control the operations of the turbine system 10. For example, in certain embodiments, the controller 38 may be coupled to a number of sensors 40 (e.g., temperature sensors, pressure sensors, clearance sensors, flow rate sensors, vibration sensors, flame sensors, or other suitable sensors) disposed throughout the gas turbine engine 12. The controller 38 may communicate (e.g., via a network or bus) with the sensors 40 to receive information regarding the turbine engine 12. For example, the controller 38 may communicate with a temperature sensor 40 coupled to the exhaust section 24 of the gas turbine engine 12 to receive a temperature of the exhaust gases. By further example, a flow sensor 40 coupled to the fuel nozzle 20 of the gas turbine engine 12 may communicate to the controller 38 the rate at which a liquid fuel in being supplied to the fuel nozzle 20. Furthermore, in certain embodiments, the controller 38 may also communicate with certain components of the turbine system (e.g., the compressor 16, the combustor 18, the turbine 22, intake vanes, valves, pumps, actuators, or other suitable components) to control or alter the operation of the gas turbine engine 12. For example, the controller 38 may communicate with the compressor 16 of the gas turbine engine 12 to instruct the field device to open or close an air intake to allow more or less air 30 into the compressor 16.

Furthermore, the illustrated turbine system 10 includes a model-based control (MBC) unit 42. The MBC unit 42 may include non-transitory code or instructions stored in a machine-readable medium (e.g., memory 41) and used by a processor (e.g., processor 43) to implement the techniques disclosed herein. In general, the MBC unit 42 may utilize one or more models (e.g., the Adaptive Real-time Engine Simulator (ARES) model 44, which may be stored in memory 41) to simulate of the operation of a system (e.g., the turbine system 10). Additionally, the disclosed MBC unit 42 may include one or more features of the gas turbine simulation and control systems disclosed in U.S. Pat. No. 7,742,904, entitled, "METHOD AND SYSTEM FOR GAS TURBINE ENGINE SIMULATION USING ADAPTIVE KALMAN FILTER," which is incorporated by reference herein in its entirety for all purposes. Based on the output of the models (e.g., the ARES model 44), the MBC unit 42 may determine a number of parameters of the gas turbine engine 12 that should be altered (e.g., to improve or modify the performance of the turbine system 10). In certain embodiments, the MBC unit 42 may be communicatively coupled to the controller 38 to receive information regarding the operation of the turbine system 10 (e.g., via sensors 40). For such embodiments, the MBC unit 42 may additionally provide the controller 38 with instructions regarding one or more parameters of the gas turbine engine 12 that should be altered, based on the output of the model (e.g., the ARES model 44), to modify the operation of the gas turbine system 10. In other embodiments, the MBC unit 42 may be part of the controller 38 (e.g., as hardware, software, or a combination thereof) or may serve as the controller 38, allowing the MBC unit 42 to directly communicate with the sensors 40 and/or the components (e.g., the compressor 16, combustors 18, turbine 22, or other suitable components) of the turbine system 10 to receive information and to control the operation of the turbine system 10.

For the turbine system 10 illustrated in FIG. 1, the ARES model 44 may simulate the operation of a model turbine system (e.g., modeled after the turbine system 10). For example, the ARES model 44 may receive inputs regarding the operation of the gas turbine engine 12, either directly from the sensors 40 (e.g., via a network) or indirectly from another source (e.g., via the controller 38 or supplied by an operator). By specific example, the ARES model 44 may receive inputs from sensors 40, including a temperature for the exhaust section 24, a flow rate for the fuel 34 entering the fuel nozzle 20 of the combustor 18, a flow rate for the air 30 entering the compressor 16, the ambient conditions near the turbine system 10, rotational speed of the turbine 22, clearance between turbine and/or compressor blades and the surrounding shroud, exhaust emissions, vibration, combustion dynamics, and so forth. Furthermore, in certain embodiments, the ARES model 44 may receive inputs regarding the turbine system 10 from an operator or user. For example, in certain embodiments, an operator may provide the MBC unit 42 with other inputs regarding the turbine system 10, such as information that may not be gleaned by the sensors 40.

Figure 2:
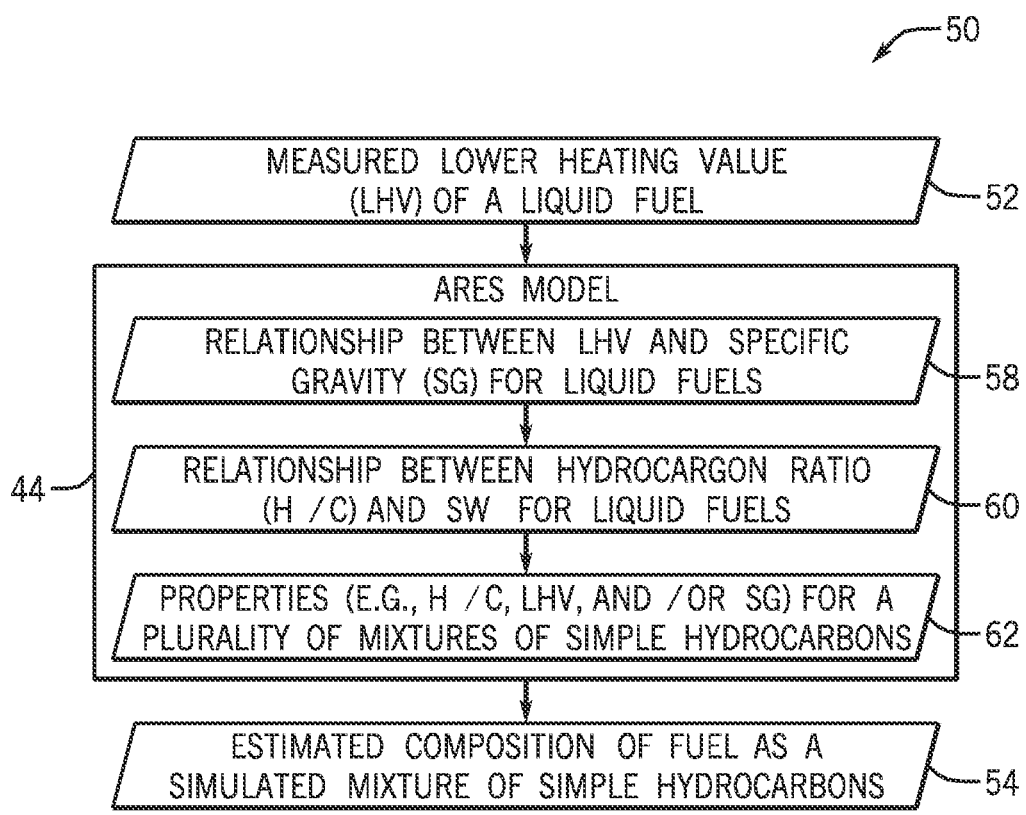
FIG. 2 is a hybrid flow diagram illustrating the flow of information into and out of the ARES model, in accordance with aspects of the present technique.

FIG. 2 is a hybrid flow diagram 50 illustrating the flow of information into and out of the ARES model 44, in accordance with an embodiment of the present technique. As illustrated in FIG. 2, the ARES model 44 receives as input a measured LHV 52 of the liquid fuel (e.g., fuel 34) in order to output an estimated composition 54 of the liquid fuel as a simulated mixture of simple hydrocarbons. For example, in certain embodiments, a portion of the liquid fuel 34 may be sampled and analyzed by an operator using a calorimeter to determine the LHV 52 of the liquid fuel. Subsequently, the operator may provide the MBC unit 42 and/or the ARES model 44 with the measured LHV 52 via a user interface of a computer, such as a human machine interface (HMI), communicatively coupled to the MBC unit 42 and/or the ARES model 44. In other embodiments, the turbine system 10 may be equipped with an automated device (e.g., automated calorimetry device 56 of FIG. 1) that may automatically sample and measure the LHV 52 of the liquid fuel 34 being supplied to the combustor 18 of the turbine system 10.

Once the measured LHV 52 of the liquid fuel has been received by the ARES model 44, the ARES model 44 may utilize equations, tables, graphs, or other suitable data stored in the memory 43 of the MBC unit 42, to model or estimate the composition 54 of the liquid fuel 34 from the measured LHV 52. For example, in certain embodiments, the ARES model 44 may store and use a relationship 58 between LHV and SG for liquid fuels to determine the SG of the liquid fuel 34 from the measured LHV 52 of the liquid fuel 34. In certain embodiments, this relationship 58 between LHV and SG for liquid fuels may be represented by the following equation:

Eq. 1

$$LHV=22{,}320-3780(SG)^2-90.8(26-15(SG))$$

As such, in certain embodiments, the ARES model 44 may use Eq. 1 (e.g., solved for SG) to calculate the SG of the liquid fuel 34 from the measured LHV 52. In other embodiments, the ARES model 44 may include a table (e.g., a lookup table, chart, graph) of values in which each row may include a pair of LHV and a SG values (e.g., based on the relationship 58 expressed by Eq. 1). In other embodiments, the ARES model 44 may include a graph expressing the relationship 58 demonstrated by Eq. 1, in which the coordinates for each point represent a pair of corresponding LHV and SG values. Accordingly, the ARES model 44 may use an equation, table, graph, or other suitable representation of the relationship 56 between LHV and SG expressed by Eq. 1 to determine or estimate the SG of the liquid fuel 34 from the measured LHV 52.

The ARES model 44 may further include a relationship 60 between the hydrocarbon ratio (H/C) of liquid fuels and the determined or estimated SG for the liquid fuel. This relationship 60 between H/C of liquid fuels and SG may be represented by the following equation:

Eq. 2

$$\text{Hydrocarbon ratio (H/C)}=(26-15(SG))(100-(26-15(SG)))^{-1}(12.01/1.01)$$

As with the relationship 58 between the LHV and the SG for liquid fuels, the relationship 60 between the H/C and the SG for liquid fuels may be directly calculated using the equation Eq. 2. In certain embodiments, the ARES model 44 may store the relationship 60 as a table (e.g., each row representing a pair of H/C and SG values), a graph (e.g., the coordinates of each data point representing a pair of H/C and SG values), or any other suitable representation (e.g., based on Eq. 2). Accordingly, the ARES model 44 may use one or more of these representations to determine or estimate the H/C of the liquid fuel 34 from the determined or estimated H/C.

The ARES model 44 may further include a collection of properties 62 for a plurality of simple hydrocarbon mixtures. In certain embodiments, the ARES model 44 may include a table storing the collection of properties 62 for a plurality of simple hydrocarbon mixtures. For example, the ARES model 44 include a table storing the collection of properties 62 in which each row may include a relative composition of methane and ethylene as well as the H/C, SG, and/or LHV for a particular methane and ethylene mixture. For example, in certain embodiments, the ARES model 44 may store H/C, SG, and/or LHV for a plurality of mixtures of methane ($CH_4$) and ethylene ($C_2H_2$) (e.g., ranging from approximately 1% $CH_4$/99% $C_2H_2$ to approximately 99% $CH_4$/1% $C_2H_2$). In various embodiments, simple hydrocarbon mixtures may include mixtures of methane, ethylene, acetylene, ethane, propane, propylene, or any combination thereof As discussed below, the ARES model 44 may use this collection of properties 62 for the plurality of simple hydrocarbon mixtures to identify a particular mixture (e.g., a best matching mixture) having a substantially similar H/C, SG, and/or LHV as the liquid fuel 34.

Figure 3:
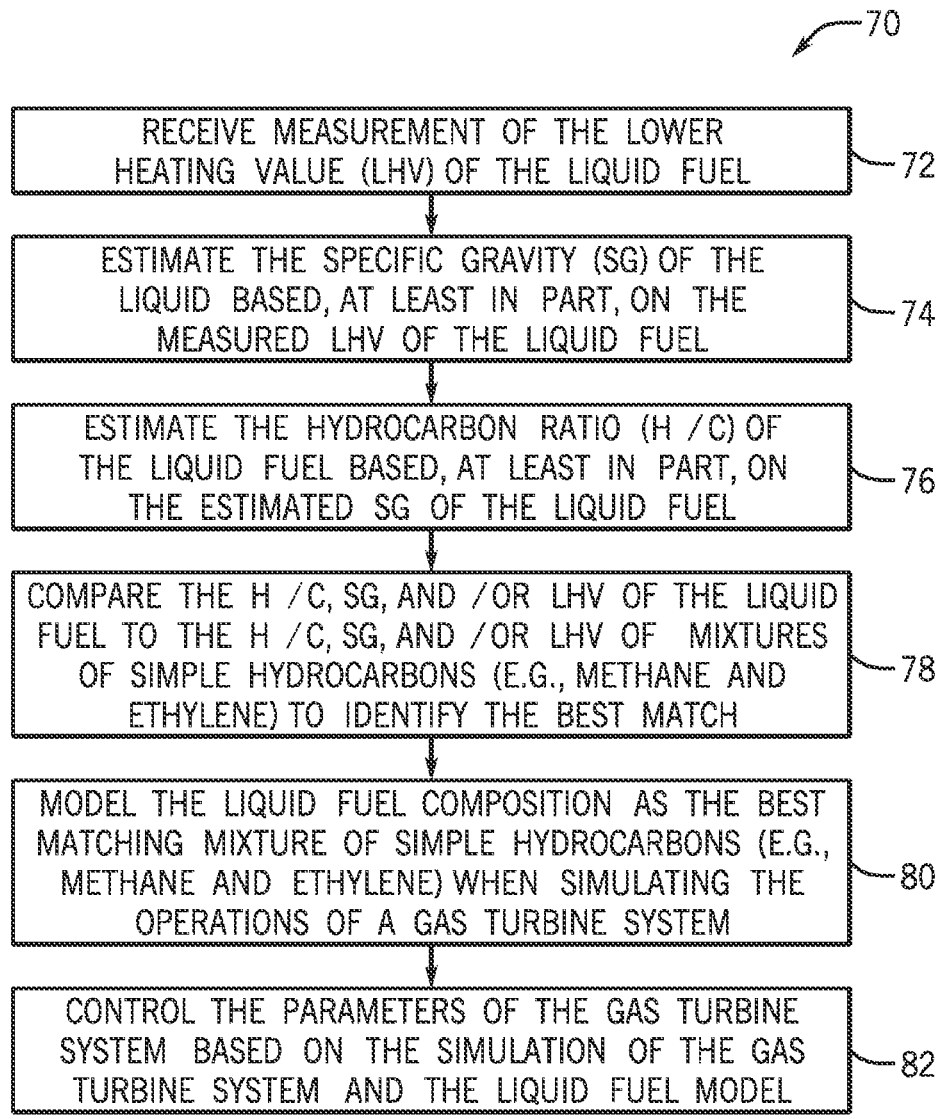
FIG. 3 is a flow diagram illustrating a process by which the MBC may model the composition of a liquid fuel and use the model to simulate and control the operations of a gas turbine system, in accordance with aspects of the present technique.

FIG. 3 is a flow diagram illustrating an embodiment of a process 70 by which the MBC unit 42 may model the composition of a liquid fuel 34 and, further, use the model to simulate and control the operations of a gas turbine system. The process 70 may include non-transitory code or instructions stored in a machine-readable medium (e.g., memory 41 of MBC unit 42) and used by a processor (e.g., processor 43 of MBC unit 42) to estimate or model the composition of the liquid fuel. The illustrated process 70 begins with the MBC unit 42 receiving (block 72) a measurement for the LHV of the liquid fuel. As mentioned, in certain embodiments, the LHV 52 of the liquid fuel may be measured via calorimetry, either manually (e.g., through the actions of the operator using a calorimeter to analyze a sample of the liquid fuel 34) or automatically (e.g., via the automated calorimeter 56 that is communicatively coupled to the MBC unit 42). As discussed below, once the MBC unit 42 has received the LHV 52 of the liquid fuel, the MBC unit 42 may utilize the ARES model 44, including the aforementioned stored relationships and properties 58, 60, and 62, to generate an estimated composition 54 of the liquid fuel.

Accordingly, after receiving the measured LHV 52 of the liquid fuel, the ARES model 44 may utilize the relationship 58 between LHV and SG for liquid fuels to determine or estimate (block 74) the SG of the liquid fuel based, at least in part, on the measured LHV 52 of the liquid fuel. For example, in certain embodiments, the relationship 58 between LHV and SG for liquid fuels may be stored in a table, and the ARES model 44 may determine the LHV value in the table that is the closest match to the measured LHV 52 in order to determine or estimate the corresponding SG of the liquid fuel 34. Similarly, once the ARES model 44 has determined or estimated the SG of the liquid fuel (block 74), the ARES model 44 may also determine or estimate (block 76) the H/C of the liquid fuel based, at least in part, on the determined or estimated SG of the liquid fuel. For example, in certain embodiments, the relationship 60 between SG and H/C for liquid fuels may be stored in a table, and the ARES model 44 may determine the SG value in the table that is the closest match to the determined or estimated SG in order to determine or estimate the corresponding H/C of the liquid fuel 34.

Then, the ARES model 44 may compare the estimated and/or measured properties of the liquid fuel 34 (e.g., the measured LHV 52, the estimated SG from block 74, and/or the estimated H/C from block 76) to the collection 62 of properties for a plurality of mixtures of simple hydrocarbons (e.g., methane and ethylene) to identify the best match. It should be appreciated that the mixtures of simple hydrocarbons may include mixtures having two, three, four, five, six, seven, eight, nine, ten, or more simple hydrocarbons species, in which each of the simple hydrocarbon species may include between 1 and 16 carbon atoms. For example, in certain embodiments, the collection of properties 62 may be in the form of a table storing properties (e.g., composition, LHV, SG, and/or H/C) for a number of mixtures of methane and ethylene. Accordingly, in certain embodiments, the ARES model 44 may use the determined or estimated H/C (e.g., from block 76) alone to identify a mixture of methane and ethylene from the table having the best matching (e.g., closest) H/C value. For example, the ARES model 44 may determine that the best estimate for the composition of the liquid fuel is a specific mixture of methane and ethylene (e.g., 5% $CH_4$ and 95% $C_2H_2$, 50% $CH_4$ and 50% $C_2H_2$, or 25% $CH_4$ and 75% $C_2H_2$) identified through the comparison of the H/C value determined for the liquid fuel in block 76 and the H/C values stored in the collection of properties 62 for the various methane and ethylene mixtures. In other embodiments, the ARES model 44 may attempt to identify a mixture of methane and ethylene from the table having similar H/C and SG values or similar H/C, SG, and LHV values. In certain embodiments, if two or more simple hydrocarbon mixtures included in the collection 62 are equally good matches for the H/C value of the liquid fuel 34, then the ARES model 44 may utilize another property of the liquid fuel (e.g., SG and/or LHV) to determine the better matching simple hydrocarbon mixture to model the liquid fuel 34.

Based on the comparison in block 78, the MBC unit 42 may model (block 80) the fuel composition of the liquid fuel as the best matching mixture of simple hydrocarbons when simulating the operations of the turbine system 10. That is, as the MBC unit 42 simulates the operations of the turbine system 10, the MBC unit 42 may estimate a number of parameters of the turbine system 10 using the best matching mixture of simple hydrocarbons identified in block 78 as a model or approximation for the composition liquid fuel 34. For example, the MBC unit 42 may simulate the flow rate of the liquid fuel 34, the air flow rate 34 of the air being mixed with the liquid fuel 34, the power output of the gas turbine engine 12 consuming the liquid fuel 34, the temperature of the exhaust section 24, the composition of the combustion byproducts in the exhaust section 24, as well as any other thermodynamic and/or performance related parameters of the turbine system 10.

Furthermore, in certain embodiments, the MPC unit 42 may additionally control (block 82) the parameters of the turbine system 10 based on the model of the turbine system and the liquid fuel. In certain embodiments, the MBC unit 42 may be communicatively coupled to the various components of the turbine system 10 and may alter one or more parameters of the turbine system 10 by providing instructions to the components (e.g., the compressor 16, the combustor 18, the turbine 22, valves, pumps, actuators, and so forth) of the turbine system 10. For example, based on the model for the liquid fuel composition determined in block 80, the MBC unit 42 may determine that the flow rate of the fuel entering the fuel nozzle 20 should be adjusted, and may send instructions to the fuel nozzle 20 and/or combustor 18 accordingly. By further example, based on the model for the liquid fuel composition, the MBC unit 42 may also determine that the air flow rate into the compressor 16 is too high, and may send instructions to the compressor 16 to reduce the flow rate of air 30 at the intake, or vice versa.

Technical effects of the presently disclosed technique include enabling the modeling of the composition of liquid fuels of unknown composition using a measured lower heating value (LHV). Using the disclosed ARES model 44, the presently disclosed model-based control unit 42 may simulate the operations of the turbine system consuming the liquid fuel. In particular, the disclosed ARES model 44 may enable an approximation of the properties (e.g., LHV, SG, and/or H/C) of the liquid fuel using a mixture of simple hydrocarbons (e.g., methane and ethylene). The disclosed model-based control (MBC) unit 42 may further utilize this model for the liquid fuel to determine how to modify the parameters of the turbine system 10 during operation. For example, since liquid fuel of a turbine system 10 may vary in composition over time, the disclosed MBC unit 42 may model (e.g., in real-time or near real-time) the composition of the liquid fuel being consumed by a gas turbine system (e.g., based upon the measured LHV value), and adjust one or more parameters of the gas turbine accordingly to avoid or reduce any undesirable inconsistency in the operation of the gas turbine system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a gas turbine system configured to consume a liquid fuel having a composition, wherein the gas turbine system comprises:
a calorimeter configured to measure and provide a lower heating value of the liquid fuel;
a model-based control unit communicatively coupled to the calorimeter and configured to control the gas turbine system, wherein the model-based control unit comprises a memory coupled to a processor, wherein the processor is configured to:
receive the lower heating value for the liquid fuel from the calorimeter;
determine a specific gravity, a hydrocarbon ratio, or both, for the liquid fuel based, at least in part, on the lower heating value of the liquid fuel;
compare the hydrocarbon ratio, the specific gravity, and/or the lower heating value of the liquid fuel to a collection of hydrocarbon ratios, specific gravities, and/or lower heating values for a plurality of mixtures of methane and ethylene;
identify a mixture of methane and ethylene from the collection of hydrocarbon ratios, wherein a hydrocarbon ratio, a specific gravity, and/or a lower heating value of the identified mixture is equal to the hydrocarbon ratio, the specific gravity, and/or the lower heating value of the liquid fuel;
model one or more parameters of the gas turbine system during operation using the identified mixture of methane and ethylene as a model for the composition of the liquid fuel; and
control the one or more parameters of the gas turbine system based, at least in part, on the model for the composition of the liquid fuel.

2. The system of claim 1, wherein the one or more parameters of the gas turbine system comprise exhaust temperature, exhaust composition, combustor temperature, fuel flow rates, air flow rates, or a combination thereof.

3. The system of claim 1, wherein the collection comprises one or more tables of hydrocarbon ratios, specific gravities, and/or lower heating values for the plurality of mixtures of methane and ethylene.

4. The system of claim 1, wherein the collection comprises one or more graphs of hydrocarbon ratios, specific gravities, and/or lower heating values for the plurality of mixtures of methane and ethylene.

5. A method of controlling, using a model-based control unit, a gas turbine system that consumes a liquid fuel having a composition, comprising:

receiving, at a processor of the model-based control unit that is coupled to a memory of the model-based control unit, a measured lower heating value for the liquid fuel from a calorimeter that is communicatively coupled to the model-based control unit;

determining, using the processor of the model-based control unit, an estimated specific gravity, an estimated hydrocarbon ratio, or both, for the liquid fuel based, at least in part, on the measured lower heating value of the liquid fuel;

identifying, using the processor of the model-based control unit, mixture of methane and ethylene from a plurality of hydrocarbon mixtures, wherein a hydrocarbon ratio, a specific gravity, and/or a lower heating value of the identified mixture of methane and ethylene is equal to the estimated hydrocarbon ratio, the estimated specific gravity, and/or the measured lower heating value of the liquid fuel;

modeling, using the processor of the model-based control unit, one or more parameters of the gas turbine system during operation using the identified mixture of methane and ethylene as a model for the composition of the liquid fuel; and controlling, using the processor of the model-based control unit, the one or more parameters of the gas turbine system based, at least in part, on the model for the composition of the liquid fuel.

6. The method of claim 5, wherein the one or more parameters of the gas turbine system comprise exhaust temperature, exhaust composition, power output, fuel flow rates, air flow rates, or a combination thereof.

7. The method of claim 5, comprising determining the measured lower heating value of the liquid fuel using the calorimeter and sending the measured lower heating value to the processor of the model-based control unit.

8. The method of claim 5, wherein the estimated specific gravity of the liquid fuel is determined using a graph, an equation, or a table that correlates specific gravities and lower heating values of liquid fuels.

9. The method of claim 5, wherein the estimated hydrocarbon ratio of the liquid fuel is determined using a graph, an equation, or a table that correlates hydrocarbon ratios and specific gravities of liquid fuels.

* * * * *